United States Patent [19]

Brewbaker et al.

[11] Patent Number: 5,268,443

[45] Date of Patent: Dec. 7, 1993

[54] LIQUID CRYSTALLINE COPOLYESTERS OF 4-HYDROXYBENZOIC ACID AND SUBSTITUTED 4-HYDROXYBENZOIC ACIDS

[75] Inventors: James L. Brewbaker; William B. Marshall, both of Midland, Mich.

[73] Assignee: The Dow Chemical Company, Midland, Mich.

[21] Appl. No.: 358,993

[22] Filed: May 30, 1989

[51] Int. Cl.$^5$ .................. C08G 63/06; C08G 63/18; C08G 63/60; C08L 67/06

[52] U.S. Cl. .................. 528/125; 528/173; 528/176; 528/190; 528/191; 528/193; 528/194; 528/271; 428/290

[58] Field of Search ............... 528/125, 173, 176, 190, 528/193, 191, 194, 271; 428/290

[56] References Cited

U.S. PATENT DOCUMENTS

| | | | |
|---|---|---|---|
| 3,549,593 | 12/1970 | Takekoshi | 528/271 |
| 4,067,852 | 1/1978 | Calundann | 528/193 |
| 4,083,829 | 4/1978 | Calundann et al. | 528/193 |
| 4,118,372 | 10/1978 | Schaefgen | 528/193 |
| 4,279,803 | 7/1981 | Calundann | 528/206 |
| 4,299,756 | 11/1981 | Calundann | 528/190 |
| 4,496,712 | 1/1985 | Irwin | 528/191 |
| 4,617,369 | 10/1986 | Huynh-Ba | 528/176 |
| 4,617,370 | 10/1986 | Lenz et al. | 528/176 |
| 4,664,972 | 5/1987 | Connolly | 528/173 |

*Primary Examiner*—Morton Foelak
*Assistant Examiner*—P. Hampton-Hightower

[57] ABSTRACT

The invention relates to a class of copolymers capable of forming an optically anisotropic melt comprising recurring structural units (a) independently each occurrence selected from the group consisting of Formula I; recurring structural units (b) independently each occurrence selected from the group consisting of Formulas II and III; and optionally recurring structural units (c) independently each occurrence selected from the group consisting of Formula IV:

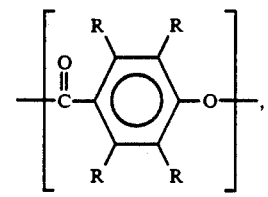

I

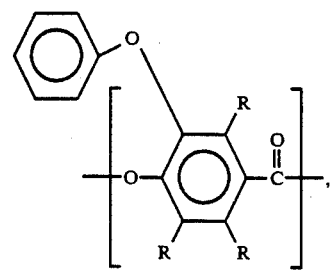

II

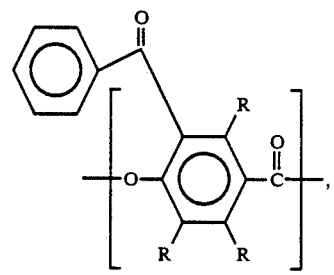

III

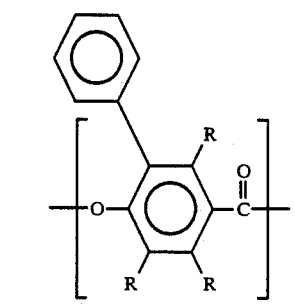

IV wherein R independently each occurrence is a chemically inert substituent.

5 Claims, No Drawings

LIQUID CRYSTALLINE COPOLYESTERS OF 4-HYDROXYBENZOIC ACID AND SUBSTITUTED 4-HYDROXYBENZOIC ACIDS

FIELD OF THE INVENTION

The invention relates to a class of copolyesters which display optical anisotropy in the molten state and to the shaped articles, fibers and films obtained from the optically anisotropic melts.

BACKGROUND OF THE INVENTION

Liquid crystalline polymers (LCPs) are macromolecules possessing significant orientation in either the molten state or in concentrated solution. The state of their solution (lyotropic) or melt (thermotropic) is between the boundaries of solid crystals and isotropic liquids. In the solid state these highly ordered polymers display exceptional strength properties in the direction of orientation. By designing molecules containing only relatively inert chemical bonds, preparation of thermally and oxidatively stable high-performance materials is possible.

A review of thermotropic LCPs can be found in Kwolek et al., "Liquid Crystalline Polymers", "Encyclopedia of Polymer Science and Engineering" 2nd Ed, Vol. 9, pp 23-55 (1987). Among those listed are polyesters. Many liquid crystalline polyesters display several of the desirable attributes of these compounds. Unfortunately, most have too high of a melt temperature for economical melt fabrication.

There is a growing need in the thermoplastic engineering industries to provide for new and improved polyesters and copolyesters which possess a high degree of processability while concurrently exhibiting superior mechanical properties.

SUMMARY OF THE INVENTION

The invention concerns copolymers capable of forming an optically anisotropic melt comprising recurring structural units (a) independently each occurrence selected from the group consisting of Formula I; recurring structural units (b) independently each occurrence selected from the group consisting of Formulas II and III; and optionally recurring structural units (c) independently each occurrence selected from the group consisting of Formula IV:

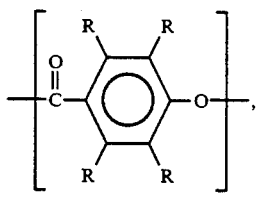

I

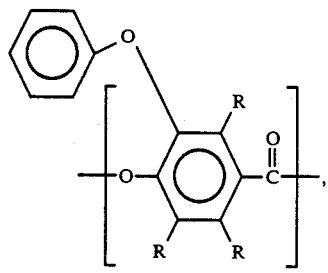

II

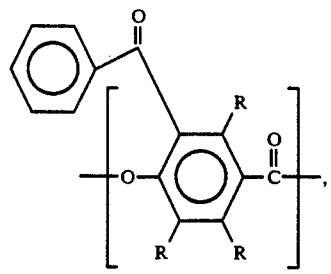

III

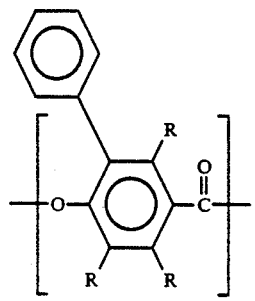

IV wherein R independently each occurrence is a chemically inert substituent.

DETAILED DESCRIPTION

Preferably, R is independently selected from the group consisting of hydrogen, halo, lower alkyl and methoxy. Most preferably, R is each occurrence hydrogen.

Desirable molar percent ranges for these copolyesters are from 35 mole percent to 95 mole percent of independently recurring units of Formula I, from 5 mole percent to 50 mole percent of independently recurring units of Formulas II or from 5 mole percent to 65 mole percent of independently recurring units of Formulas III, or from 5 mole percent to 50 mole percent of independently recurring units of Formulas II, III and IV wherein the ratio of Formula II and III units to Formula IV units varies from 100:0 to 10:90.

More preferable molar percent ranges for these copolyesters are from 50 mole percent to 90 mole percent of independently recurring units of Formula I, from 10 mole percent to 50 mole percent of independently recurring units of Formulas II or III, or from 10 mole percent to 50 mole percent of independently recurring units of Formulas II, III and IV wherein the ratio of Formula II and III units to Formula IV units varies from 100:0 to 10:90.

The most preferred molar percent ranges are from 60 mole percent to 90 mole percent of independently recurring units of Formula I, from 10 mole percent to 40 mole percent of independently recurring units of Formulas II or III, or from 10 mole percent to 40 mole percent of independently recurring units of Formulas II, III and IV wherein the ratio of Formula II and III units to Formula IV units varies from 100:0 to 10:90.

The copolymers may be formed by a variety of ester-forming techniques from difunctional organic compounds possessing functional groups which upon polycondensation form the requisite recurring units. For example, the functional groups of the organic aromatic compounds may independently contain carboxylic acid groups or acid halide groups and functional groups reactive therewith such as hydroxyl or acyloxy groups. In a preferred embodiment, the organic reactants comprise lower acyloxy and carboxylic acid functionality. For example, lower acyl esters of 4-hydroxybenzoic acid, 3-phenyl-4-hydroxybenzoic acid, 3-benzoyl-4-hydroxybenzoic acid, 3-phenoxy-4-hydroxybenzoic acid wherein the hydroxy group is esterified are more preferred as reactants. The lower acyl groups preferably have from 2 to 4 carbon atoms. Most preferably, the acetate esters are used.

The organic compounds may be allowed to react under anhydrous conditions in an inert atmosphere via a melt acidolysis procedure, in a suitable solvent via a solution procedure, or in a heat exchange medium via a slurry polymerization as described in Calundann, U.S. Pat. No. 4,067,852. Additional suitable reaction conditions are described in Schaefgen, U.S. Pat. No. 4,118,372. The teachings of the foregoing U.S. patents are incorporated herein by reference. A preferable technique is the melt acidolysis technique.

A catalyst may or may not be used in the polymerization process. If one is used, representative catalysts for use in the process include dialkyl tin oxides (e.g., dibutyl tin oxide), diaryl tin oxides, titanium dioxide, alkoxy titanium silicates, titanium alkoxides, Lewis acids, hydrogen halides (e.g., HCl), alkali and alkaline earth metal salts of carboxylic acids (e.g., sodium acetate). The quantity of catalyst utilized typically is from 0.001 to 1 weight percent based upon total reactant weight, and most commonly from 0.01 to 0.2 weight percent. In a preferred method of polymerization, a catalyst is not used.

Liquid crystalline copolyester melts of this invention may be extruded into articles such as fibers which have outstanding strength and stiffness and will maintain their useful properties at elevated temperatures. Such fibers would be useful as tire cords, reinforcement in hoses, cables, conveyor belts or composite structures with matrixes prepared from other resinous materials. Articles may be films formed from the copolyesters which will have excellent solvent and chemical resistance. In addition, they should have low flammability and good electrical insulating properties. They would be useful as cable wrap, electric motor dielectric film and wire insulation. These copolyesters are useful for the manufacture of shaped articles such as those which are injection molded possessing high strength, stiffness, chemical resistance and low flammability.

Conventional additives and processing aids can be added to the copolyester melts of the invention to improve the properties of articles made therefrom. Examples of additives are oxidation stabilizers; heat stabilizers; ultraviolet light (UV) stabilizers; lubricants; mold release agents; dyes and pigments; fibrous or powdered fillers and reinforcing agents; nucleating agents; and plasticizers.

Examples of oxidation stabilizers and heat stabilizers are halides of metals of group I of the Periodic Table, used alone and used as a mixture with copper (I) halides or sterically hindered phenols in concentrations from 0.001 to 1 weight percent based on the weight of the copolyester composition.

Examples of UV stabilizers are substituted resorcinols, salicylates, benzotriazoles, benzophenones and mixtures of these, which are added, for example, in amounts from 0.001 to 2 weight percent based on the weight of the copolyester composition.

Dyes and pigments are used, for example, in amounts from 0.001 to 5 weight percent based on the weight of the copolyester composition. Examples are nigrosine, titanium dioxide, cadmium sulfide, phthalocyanine dyes, ultramarine blue and carbon black.

Examples of fillers and reinforcing agents are carbon fibers, glass fibers, amorphous silica, calcium silicate, aluminum silicate, magnesium carbonate, kaolin, chalk, powdered quartz, mica and feldspar, which may be present in a concentration from 0.5 to 70 weight percent, based on the total weight of the filled material.

Examples of nucleating agents are talc, calcium fluoride, sodium phenylphosphonate, alumina and finely divided polytetrafluoroethylene. Suitably, the nucleating agent may be present in an amount from 0.001 to 1 percent by weight.

Plasticizers, such as phthalates, hydrocarbon oils and sulfonamides can be included in an amount of from 0.0001 to 20 weight percent, based on the weight of the composition.

Also included in the composition of the invention, in addition to or in partial replacement of the reactants of Formulas I, II, III or IV are amounts of other aromatic polymerizable units whose presence do not interfere with the excellent mechanical properties of these copolyesters. Examples of such aromatic units comprising these additional repeating units are 2-hydroxy-6-naphthoic acid, 4-hydroxy-4'-carboxybiphenyl and 3-hydroxybenzoic acid.

Preparation of 4-Acetoxybenzoic Acid

An amount of 4-hydroxybenzoic acid (92.1 grams (g), 0.67 mole) was dissolved in a solution of sodium hydroxide (NaOH) (53.4 g, 1.33 moles) and 1.33 liters (L) of water in a 4 L beaker. The solution was stirred and cooled to a temperature of 0° C. by adding crushed ice, then acetic anhydride (102.1 g, 1.00 mole) was added. The temperature was maintained at $-2°$ C. for 1 hour by adding one kilogram (kg) of crushed ice. A solution of concentrated hydrochloric acid (HCl) (144.7 g, 1.42 moles) in 267 milliliters (ml) of water was added. The slurry was stirred briefly and filtered. The product was washed twice by stirring it with 2 L portions of fresh water then filtered and dried in a vacuum oven at 80° C. for 16 hours. After recrystallization from methyl isobutyl ketone, the product consisted of 111 g of white crystals with a melting point (m.p.) of 192° C. to 192.5° C.

Preparation of 3-Benzoyl-4-Acetoxybenzoic Acid

A solution of benzoyl chloride (24.2 g, 0.30 mole) in 25 ml of cyclohexane was added over 5 minutes to a refluxing mixture of p-methylanisole (44.0 g, 0.36 mole), anhydrous zinc chloride (0.41 g, 3 millimoles (mmol)) and 75 ml of cyclohexane. The mixture was refluxed under nitrogen for 23 hours. After 2.5 hours, an additional 0.41 g of anhydrous zinc chloride was added. The resulting black solution was washed two times with 100 ml of 0.5N sodium hydroxide (NaOH), then with 1N hydrochloric acid (HCl), then with a 5 weight percent solution of aqueous sodium bicarbonate ($NaHCO_3$) and water. The clear yellow solution was dried with magnesium sulfate ($MgSO_4$), then the solvent was removed and the viscous yellow oil which remained was vacuum distilled through a six inch Vigreaux column. The product, 2-methoxy-5-methylbenzophenone was collected as a clear colorless oil which slowly crystallized.

An amount of 2-methoxy-5-methylbenzophenone (14.2 g, 62.7 mmol) and a solution of potassium permanganate (KMnO₄) (24.8 g, 157 mmol) in 300 ml of water were stirred under reflux (102° C.) for one hour. The reaction mixture was cooled to 45° C. and sodium hydrogen sulfite (NaHSO₃) (45 g, 0.44 mole) was dissolved in the reaction mixture. Slowly 50 g of concentrated HCl was added. The white solid which was produced was taken up twice in 250 ml of ether. The combined organic phase was extracted twice with 150 ml of 0.67N NaOH. The ether phase was dried with MgSO₄ and the ether was removed. There remained 7.49 g of unreacted starting material. The combined basic extracts were acidified with concentrated HCl and extracted twice with 250 ml of ether. The ether extracts were dried with MgSO₄ and concentrated to produce 3-benzoyl-4-methoxybenzoic acid. The product was recrystallized from a mixture of 100 ml of ethanol and 200 ml of water.

A solution of 3-benzoyl-4-methoxybenzoic acid (10.23 g, 40 mole), 100 ml of 48 weight percent aqueous hydrobromic acid (HBr) (149 g, 0.88 mole) and 200 ml of acetic acid was refluxed under nitrogen. After five hours, a white solid began to separate. After 22 hours, the slurry was cooled in ice and filtered. The white solid which was collected was washed with water and dried in a vacuum oven. There remained white granular 3-benzoyl-4-hydroxybenzoic acid.

Acetic anhydride (10.5 g, 0.103 mmol) was added to a solution of 3-benzoyl-4-hydroxybenzoic acid (12.5 g, 51.6 mole) and NaOH (4.33 g, 0.108 mmol) in 250 ml of water under nitrogen. The clear colorless solution was stirred at 8° C. for one hour. The product separated initially as a colorless oil which soon crystallized to a white solid. The slurry was made strongly acidic by adding concentrated HCl, and was extracted with ether. The ether extract was washed with water, and dried with MgSO₄ and evaporated to dryness providing crude acetoxy acid. The crude product was recrystallized from a mixture of 200 ml of toluene and 150 ml of cyclohexane to give 3-benzoyl-4-acetoxybenzoic acid with a m.p. of 162.5° C. to 163° C.

Preparation of 3-Phenyl-4-Acetoxybenzoic Acid

A solution of 2-hydroxybiphenyl (51.2 g, 0.300 mole), 50 weight percent aqueous NaOH solution (28.6 g, 0.360 mole) and 120 ml of deionized water were added to a one-liter, three-necked, round-bottom flask equipped with a cold water condenser, nitrogen inlet, thermometer, and an air-powered paddle stirrer. The solution was stirred under nitrogen until homogeneous, then 175 ml of a methylene chloride solution of bromoethane (65.3 g, 0.600 mole) and tetrabutylammonium bromide (9.70 g, 0.030 mole) was added with vigorous stirring. The reaction mixture was stirred at room temperature for 22 hours. The mixture was transferred to a one-liter separatory funnel and the organic layer was decanted and saved. Before discarding the aqueous layer, it was extracted with 25 ml of methylene chloride. The methylene chloride extract was added to the organic reaction solution which was added to a bottle containing 100 ml of 10 weight percent aqueous NaOH solution. The mixture was shaken vigorously for 0.5 hours on a mechanical shaker. The separated aqueous layer was discarded. The organic layer was washed twice with 50 ml of 1N HCl followed by a 50 ml deionized water wash. The organic solution was stored over anhydrous MgSO₄ for several hours then the solvent was removed by rotary evaporation to provide a salmon-colored liquid. The sides of the flask were scraped with a glass stirring rod inducing crystallization of the product, 2-ethoxybiphenyl.

A solution of 2-ethoxybiphenyl (19.8 g, 0.100 mole) and 100 ml of carbon disulfide were added to a 250-ml, three-necked, round-bottom reaction flask equipped with a cold water condenser, nitrogen inlet, thermometer and polytetrafluoroethylene-coated magnetic stir bar. The solution was maintained under nitrogen and brought to a mild reflux at approximately 46° C. Anhydrous aluminum chloride (AlCl₃) (13.8 g, 0.104 mole) was added slowly to the refluxing solution via a dropping funnel. A green, heterogeneous mixture was formed. Approximately 60 ml of a carbon disulfide solution containing acetyl chloride (8.07 g, 0.103 mole) was added dropwise to the refluxing reaction solution over 100 minutes. The reaction solution was refluxed for an additional hour after the last acetyl chloride addition, then cooled to room temperature. The reaction solution was poured slowly into a cold HCl solution and stirred. The contents were then transferred to a 500 ml separatory funnel, shaken, and the separated organic layer was stored over anhydrous MgSO₄. Before discarding, the aqueous layer was washed with 25 ml of layer. The dried organic layer was filtered and the volatiles were rotary evaporated off leaving a tan solid which was dried under vacuum at 60° C. for two hours yielding a crude product. The solid was recrystallized from hexane to give 3-phenyl-4-ethoxyacetophenone.

A mixture of 3-phenyl-4-ethoxyacetophenone (32.2 g, 0.134 mole) and 250 ml of p-dioxane was added to a one-liter, three-necked, round-bottom flask equipped with a pressure equalizing dropping funnel, thermometer and a polytetrafluoroethylene-coated magnetic stir bar. The mixture was stirred to dissolve the solid, then 480 ml of sodium hypobromite solution (0.53 mole), prepared by dissolving NaOH (126 g, 3.15 moles) in 600 ml of deionized water, followed by dropwise addition of 45 ml of bromine (0.87 mole) over a 60 minute time period, was added. The solution temperature rose from 22° C. to 48° C. during the addition. The reaction solution was stirred an additional 15 minutes after the last of the NaOBr addition, then a solution of 40 weight percent aqueous NaHSO₃ (41.9 g, 1.61 moles) was added to remove any remaining NaOBr. The solution was then immersed in an ice bath and acidified to a pH of 2 with concentrated HCl. A light yellow solid precipitated upon acidification. The solid was filtered, recrystallized from a dioxane and water mixture, filtered and dried under vacuum at 60° C. overnight to yield a light yellow solid of 3-phenyl-4-ethoxybenzoic acid.

A solution of 3-phenyl-4-ethoxybenzoic acid (26.6 g, 0.110 mole) and 550 ml of acetic acid was added to a one-liter, three-necked, round-bottom flask equipped with a 250 ml pressure equalizing dropping funnel, thermometer, cold water condenser, nitrogen inlet adapter and a polytetrafluoroethylene-coated magnetic stir bar. The flask was purged with nitrogen and the solution was brought to reflux. Approximately 125 ml of a 48 weight percent solution of HBr was added dropwise over fifteen minutes to the refluxing solution. The solution was refluxed for 30 hours. Without cooling, the solvent was rotary evaporated off leaving a slurry of a pinkish solid. The slurry was poured into one liter of deionized water and the mixture was stirred for one hour and filtered. The filter cake was dried in an 80° C. vacuum oven for three hours yielding 3-phenyl-4-hydroxybenzoic acid.

A solution of 3-phenyl-4-hydroxybenzoic acid (131.1 g, 0.061 mole) and a 50 weight percent aqueous solution of NaOH (10.5 g, 0.131 mole) in 350 ml of deionized water was added to a 500 ml, three-necked, round-bottom flask equipped with a thermometer and a polytetrafluoroethylene-coated magnetic stir bar. The solution was stirred to homogeneity and then immersed in an ice water bath. With the solution temperature at 10° C., acetic anhydride (12.7 g, 0.124 mole) was added rapidly with stirring. Immediately, a white precipitate began to form. The reaction mixture was stirred for one hour at 10° C., then neutralized with concentrated HCl. The precipitate was filtered, washed in 500 ml of deionized water for one hour, filtered, and dried in an 80° C. vacuum oven for three hours yielding an off-white solid. The solid was recrystallized from a toluene and hexane mixture to give a fluffy white solid, 3-phenyl-4-acetoxybenzoic acid with a m.p. of 185° C. to 187° C.

Preparation of 3-Phenoxy-4-Acetoxybenzoic Acid

A solution of bromine (79.9 g, 0.500 mole) in 100 ml of carbon tetrachloride (CCl$_4$) was slowly added over a 15 minute period to a stirred solution of 4-methylanisole (61.1 g, 0.500 mole) in 400 ml Of CCl$_4$ at 25° C. in the dark. Gaseous HBr evolved. Slight cooling was used to keep the temperature at 25° C. to 30° C. After 1.5 hours, the evolution of HBr stopped and the deep red solution was allowed to stand in the dark overnight. The reaction mass was washed with aqueous solutions of NaHSO$_3$ and NaHCO$_3$, then with water. The solution was dried, concentrated and vacuum distilled through a 30 cm column packed with ceramic saddles. The fraction boiling between 102° C. and 105° C. at 8 mm Hg was collected. The product, 2-bromo-4-methylanisole was a clear colorless liquid.

A stirred mixture of phenol (20.7 g, 0.220 mole) and powdered KOH (12.3 g, 0.220 mole) was slowly heated to 167° C. under nitrogen. At 120° C., the reaction mass became a clear colorless liquid. The pressure was slowly reduced. At 150 mm Hg, water began to distill. When most of the water had been removed, the reaction mass solidified. The white solid was held at 167° C. and 1 mm Hg for 30 minutes to remove the last traces of water, then cooled to room temperature. Electrolytic copper dust (70 milligrams (mg), 0.0011 gram-atoms), 2-bromo-4-methylanisole (40.4 g, 0.200 mole) and phenol (10.4 g, 0.110 mole) were added, then the flask was lowered into an oil bath that had been preheated to 200° C. All the solid dissolved. The dark red liquid was stirred under nitrogen at 200° C. for 3.5 hours. The reaction mass was cooled, diluted with 500 ml of ether, and washed three times with 100 ml portions of 1N NaOH, then with 1N HCl, then with 5 weight percent aqueous NaHCO$_3$ solution and with water. The solution was filtered to remove a few droplets of undissolved black tar, then cooled in dry ice. The product, 2-phenoxy-4-methylanisole separated as an oil which slowly crystallized.

A solution of 2-phenoxy-4-methylanisole (26.9 g, 0.126 mole), KMnO$_4$ (48.8 g, 0.315 mole), 240 ml of deionized water and 480 ml of pyridine was added to a two-liter, one-necked, round-bottom flask equipped with a reflux condenser and a polytetrafluoroethylene-coated magnetic stir bar. The solution was brought to reflux while stirring for 1.5 hours at which point the solution was brown and the heating mantle was removed. The mixture was brought to near dryness on a rotary evaporator. Approximately 250 ml of deionized water was added to the flask with NaHSO$_3$ (41.6 g, 0.400 mole). Concentrated HCl was added slowly to the aqueous solution resulting in the precipitation of an off-white solid. The solid was filtered and washed in 600 ml of deionized water for one hour, refiltered and dissolved in 250 ml of deionized water with NaOH (0.15 mole). The aqueous solution was extracted with 125 ml of ether to remove unreacted starting material. The aqueous layer was added dropwise into a rapidly stirred dilute acid solution of HCl (0.2 mole) in 600 ml of water, resulting in the precipitation of a white, finely divided solid. The white solid was collected and dried at 100° C. under vacuum for four hours yielding an off-white solid that was 3-phenoxy-4-methoxybenzoic acid.

A solution of 3-phenoxy-4-methoxybenzoic acid (17.0 g, 0.07 mole), a 48 weight percent aqueous solution of HBr (165 ml, 1.39 mole) and 350 ml of glacial acetic acid was added to a 1-liter, one-necked, round-bottom flask equipped with a reflux condenser, nitrogen inlet adapter and a polytetrafluoroethylene-coated magnetic stir bar. The solution was heated under nitrogen and refluxed for 16 hours. While still hot, the flask was transferred to a rotary evaporator and the volatiles were removed leaving a salmon-colored solid which was added to 200 ml of 1.25N NaOH solution (0.25 mole). Most of the solid dissolved. The insoluble portion was filtered off. The remaining aqueous base solution was added dropwise to a stirred aqueous HCl solution (0.25 mole in 400 ml deionized water) resulting in the precipitation of a salmon-colored solid. The solid was washed in 300 ml of deionized water for 1 hour, filtered, dried at room temperature overnight, and dried under vacuum at 100° C. for 1 hour yielding 3-phenoxy-4-hydroxybenzoic acid.

A solution of 3-phenoxy-4-hydroxybenzoic acid (13.9 g, 0.0560 mole), 200 ml of deionized water, and NaOH (11.2 g of 50 weight percent aqueous solution, 0.140 mole) was added to a 500-ml conical flask equipped with a thermometer and a polytetrafluoroethylene-coated magnetic stir bar. The reaction flask was immersed in an ice bath and stirred. Acetic anhydride (12.2 g, 0.120 mole) was added rapidly to the stirred solution causing a temperature increase from 7° C. to 12° C. Approximately one minute after the acetic anhydride addition, a precipitate began to appear. The solution was stirred for one hour at 5° C. to 7° C. and was neutralized with concentrated HCl (15 g, 0.15 mole) causing further precipitation. The off-white precipitate was filtered and washed with 200 ml of deionized water for one hour, refiltered and dried at 80° C. under vacuum for two hours yielding an off-white solid. This product was recrystallized from toluene, filtered and dried one hour under vacuum to yield an off-white solid which was 3-phenoxy-4-acetoxybenzoic acid with a m.p. of 181° C. to 183° C.

Having described the invention, the following examples are provided as further illustrative and are not to be construed as limiting.

General Melt Polymerization Procedure

Small-scale melt polymerizations were carried out in 15 mm internal diameter (I.D.) polymerization tubes for 1 to 3 g quantities and in 24 mm I.D. polymerization tubes for 6 g quantities. The tubes were fitted with a head equipped with an adjustable capillary tube, a combined distillate delivery tube and air condenser, a receiver and a combined nitrogen inlet and vacuum port. The lower portion of the polymerization tube was heated in a small, vertical hot air oven. After the reactants were added to the polymerization tube, it was evacuated and refilled with nitrogen three times, then heated to 260° C. After the reactants had melted to form a liquid reaction mass, a capillary tube was lowered below the liquid surface and the nitrogen flow was adjusted to show a slow stream of bubbles passing through the liquid. The polymerization was held at 260° C. until about one half of the theoretical amount of acetic acid had been collected. At this point, the temperature was increased and the pressure was reduced at a rate sufficient to keep the rate of acetic acid evolution steady. A typical heating schedule was 1 hour at 260° C., 1 hour at 300° C. and 1 hour at 320° C. The liquid was then put under vacuum of 1 mm Hg at 340° C. for 30 minutes. The viscosity of the reaction mass was periodically measured by moving the capillary through the liquid. The capillary was raised to a position about 1 cm above the reaction mass before the mass became solid or extremely viscous. The polymerization was stopped when approximately all the theoretically calculated amount of acetic acid had been collected. The reaction mass was cooled and a polymer plug formed which was removed from the tube, then ground up on a centrifugal grinder.

Melt temperature analysis was carried out using differential scanning calorimetry (DSC) on a 15 mg compressed pellet at a heating and cooling rate of 20° C. per minute on a Mettler DSC-30 low temperature cell with a Mettler TC10A thermal analysis processor (Mettler Instrument Corp., Hightstown, N.J.).

Optical anisotropy of the copolyester melts can be determined by examination of the materials with the use of an optical microscope. The equipment used for determining the optical anisotropy of the copolyesters of the present invention included a TH 600 hot stage, (Linkham Scientific Instruments LTD, Surrey, England) and a Nikon Optiphot Microscope equipped with crossed polarizers and a 35 mm camera (Nikon Instrument Group, Nikon, Inc., Garden City, N.Y.). A thin film of the polymers shown in Tables I and II were optically anisotropic above their DSC-determined melting temperature when observed through a polarizing microscope.

EXAMPLES I THROUGH V

Preparation of Capolyesters from 4-Acetoxybenzoic Acid and 3-Benzoyl-4-acetoxybenzoic Acid The copolyesters of these examples were prepared using the general melt polymerization procedure as described above. The mole fraction of the 4-acetoxybenzoic acid (4-ABA), the remainder being 3-benzoyl-4-acetoxybenzoic acid, the glass transition temperature, Tg, and the melt temperature, Tm, are shown in Table I.

TABLE I

Thermal Data for Copolyesters Prepared From 3-Benzoyl-4-acetoxybenzoic Acid and 4-Acetoxybenzoic Acid

| Mole Fraction 4-ABA | Tg (°C.) | Tm (°C.) |
| --- | --- | --- |
| 0.35 | 110 | 152 |
| 0.50 | 120 | 152 |
| 0.65 | 112 | 184 |
| 0.75 | 114 | 306 |
| 0.85 | — | 334 |

EXAMPLES VI THROUGH VIII

Preparation of Copolyesters from 4-Acetoxybenzoic Acid and 3-Phenoxy-4-acetoxybenzoic Acid The copolyesters of these examples were prepared using the general melt polymerization procedure as described above. The mole fraction of the 4-ABA, the remainder being 3-phenoxy-4-acetoxybenzoic acid, the glass transition temperature, Tg, and the melt temperature, Tm, are shown in Table II.

TABLE II

Thermal Data for Copolyesters Prepared from 3-Phenoxy-4-acetoxybenzoic Acid and 4-Acetoxybenzoic Acid

| Mole Fraction 4-ABA | Tg (°C.) | Tm (°C.) |
| --- | --- | --- |
| 0.50 | 116 | 261 |
| 0.60 | 132 | 327 |
| 0.70 | 121 | 326 |

What is claimed is:

1. A copolymer capable of forming an optically anisotropic melt comprising recurring structural units corresponding to the formula:

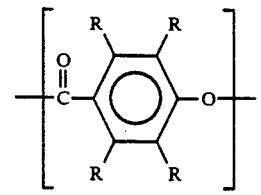

and recurring structural units corresponding to the formula:

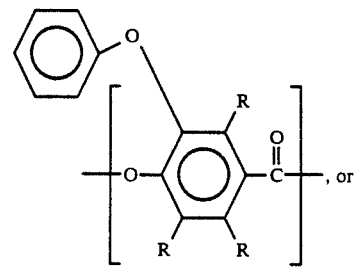, or

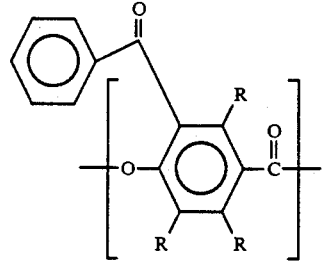

wherein R, each occurrence, is a chemically inert substituent.

2. The copolymer of claim 1 wherein R is independently selected from the group consisting of hydrogen, halo, lower alkyl and methoxy.

3. An injection molded article of the copolymer of claim 1,

4. An oriented fiber of the copolymer of claim 1.

5. A film of the copolymer of claim 1.

* * * * *